United States Patent [19]
Lin

[11] Patent Number: 6,106,330
[45] Date of Patent: Aug. 22, 2000

[54] ADAPTER HOUSING FOR CONNECTORS

[75] Inventor: Mike H. Lin, Cerritos, Calif.

[73] Assignee: International Connectors and Cable Corporation, Cerritos, Calif.

[21] Appl. No.: 09/087,251

[22] Filed: May 29, 1998

[51] Int. Cl.[7] .................................................. H01R 13/73
[52] U.S. Cl. ......................................... 439/557; 439/562
[58] Field of Search .................................... 439/551, 552, 439/553, 554, 555, 556, 557, 354, 562, 565

[56] References Cited

U.S. PATENT DOCUMENTS

| 5,125,852 | 6/1992 | Archer | 430/555 |
| 5,131,867 | 7/1992 | Peloza et al. | 439/552 |

OTHER PUBLICATIONS

Krone Catalog entitled "Wiring System Components," cover page and "Modular Adapters" p. 8–4, Jan. 31, 1996.
AMP 1996–97 Product Catalog Sep. 1996, cover page and "FLEX–MODEModular Furniture Faceplate Kit", P.66.
ICC, Premise Wiring Solutions catalog, front and back covers and p. 7, published more than one year prior to the filing date of May 29, 1998.
Leviton Catalog, back cover and p. C4, entitled "Modular Hardware," 1995.

Primary Examiner—Gary F. Paumen
Assistant Examiner—Katrina Davis
Attorney, Agent, or Firm—Christie, Parker & Hale, LLP

[57] ABSTRACT

An adapter housing for insertion into the outlet of a base product wherein the outlet is configured to receive a connector. The adapter housing includes a front wall, a top wall extending rearwardly from the front wall, and a bottom wall extending rearwardly from the front wall. The adapter housing also includes a means for mounting the housing to the outlet. The adapter housing may also be provided with a flush front wall for future expansion of the outlet or a front wall with an opening for the mounting of a connector. The adapter housing provides extra support at the back of the adapter housing by including a first leg and a second leg at the back of the housing. Each leg extends between the bottom wall and the top wall. The first and second legs are spaced from each other and from the front wall. Preferably, the legs may be arch shaped. The first and second legs serve as support structures for the back of the adapter housing such that they prevent the bottom wall and the top wall of the adapter housing from bending. The legs aid in preventing the adapter housing from popping out of the outlet of a base product. Therefore, the adapter housing tends to remain securely retained within the outlet.

16 Claims, 8 Drawing Sheets

ADAPTER HOUSING FOR CONNECTORS

The present invention relates generally to the field of electrical connectors and, more particularly, to an adapter housing for connectors which may be inserted into the outlet of a base product wherein the outlet is configured to receive a connector. Although the present invention is subject to a wide range of applications, it is especially suited for use with electrical connectors, and will be particularly described in that connection.

BACKGROUND OF THE INVENTION

The proliferation of networking and telecommunications equipment has increased the need for a variety of different electrical connectors. Housings are currently installed into the outlets or ports of a variety of different base products such as patch panels, surface mount boxes, modular furniture plates, face plates, etc. to aid in the connection of networking and telecommunications equipment. The housings have an opening in the back so that when the housings are inserted into the outlet of a base product the housings allow cable feed-through access. The housings commonly have a cantilever latch or some other sort of latch such that when the housing is inserted into an outlet it latches to the outlet and is thereby secured in the outlet.

Housings may be installed into the outlets of these base products for both future expansion and for current cable feed-through access. There are two variations of the basic housing. In the first variation, the housing has a flush front wall and is inserted into the outlet of a base product for future expansion of the outlet and is primarily used as a space filler. The flush wall prevents dust from collecting in the opening until the outlet is ready for use. In the second variation, the housing has a cable feed-through hole in the center of the front wall for mounting a connector and is used for existing outlets. The cable feedthrough hole with the connector mounted therein allows cables to feed through the housing.

A widely used prior art housing, currently used in the electrical connector industry, consists of a backward C-shaped housing having a front wall, a top wall, and a bottom wall extending rearwardly from the front wall. The prior art housing also has an opening in the back and a cantilever latch extending from the top wall. A disadvantage of this type of housing is that it provides insufficient support in the back of the housing. The bottom wall and the top wall of the housing bend very easily, due to the lack of support in the back of the housing, and therefore the housing may easily pop out of the outlet of a base product. Since adapter housings have a tendency to pop out of place, extra time, effort, and money is needlessly expended attempting to secure and re-secure these housings into their respective outlets.

In view of the above, it should be appreciated that there is a need for an adapter housing for connectors that provides the advantage of having sufficient support at the back of the housing such that the housing may be securely retained within an outlet of a base product. The present invention satisfies these and other needs and provides further related advantages.

SUMMARY OF THE INVENTION

The present invention is embodied in an adapter housing for connectors that provides sufficient support at the back of the housing such that the housing may be securely retained within an outlet of a base product. The adapter housing of the present invention may be inserted into the outlet of a base product wherein the outlet is configured to receive a connector. The adapter housing includes a front wall, a top wall extending rearwardly from the front wall, and a bottom wall extending rearwardly from the front wall. The adapter housing also includes a means for mounting the housing to the outlet.

An important feature of the present invention is that it provides extra support at the back of the housing. The housing has a first leg and a second leg and each leg extends between the bottom wall and the top wall. The first and second legs are spaced from each other and from the front wall. Preferably, the legs may be arch shaped. The first and second legs serve as support structures for the back of the housing such that they prevent the bottom wall and the top wall of the housing from bending. Advantageously, this aids in preventing the housing from popping out of the outlet of a base product. Therefore, the housing tends to remain securely retained within the outlet. This provides the related advantage of obviating the need to expend extra time, effort, and money to secure and re-secure the housing into its respective outlet.

The first leg and the second leg are also spaced from the front wall such that a pair of apertures are formed allowing a nut of the associated connector to protrude into or through the apertures and such that the nut may be physically manipulated to be tightened or loosened. This allows the adapter housing to be used in the same way as prior art housings which had no side walls to accommodate the nut of the associated connectors. Advantageously, the housing of the present invention having legs at the back of the housing along with spaced apertures, improves the design of the prior art housing by providing the additional strength needed while at the same time maintaining the same basic design such that it can still be used with all of the same base products, outlets, and connectors as the previous prior art housings.

Other features and advantages of the present invention will become apparent from the following description of the preferred embodiments, taken in conjunction with the accompanying drawings, which illustrate, by way of example, the principles of the invention.

DETAILED DESCRIPTION OF THE PREFERRED EMBODIMENTS

Figure 1:
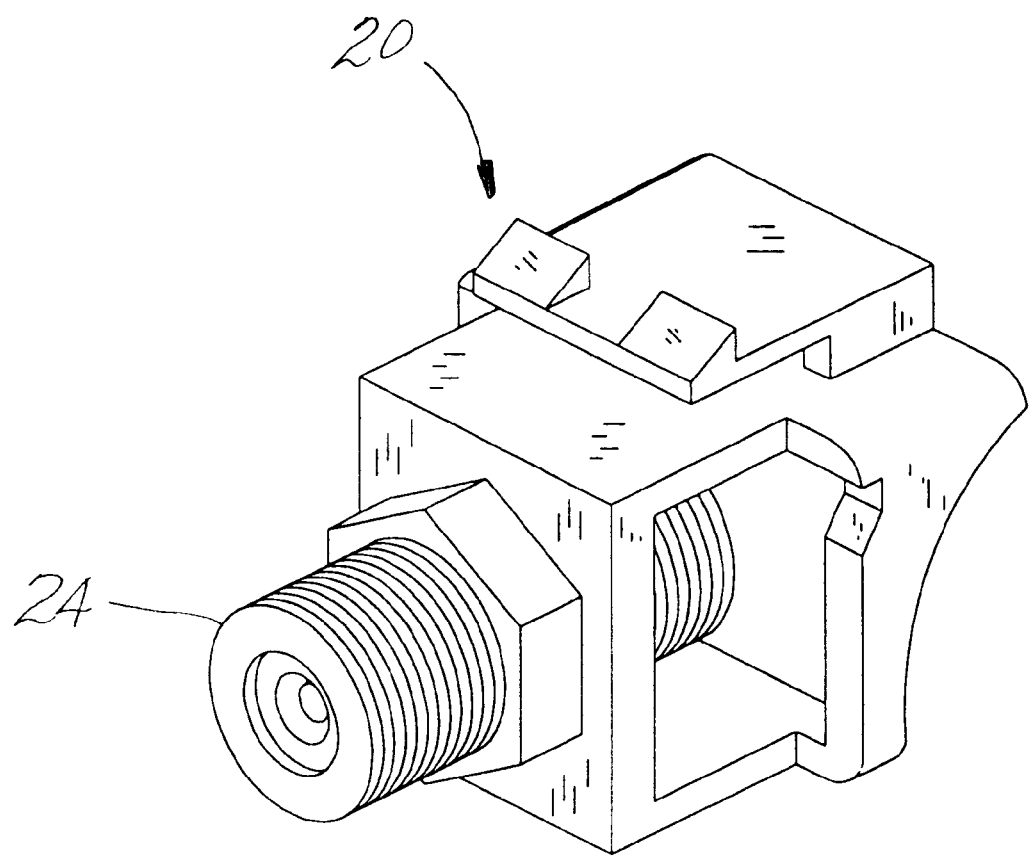
FIG. 1 is a top perspective view of an adapter housing according to the present invention with a connector mounted to the adapter housing.
Figure 2:
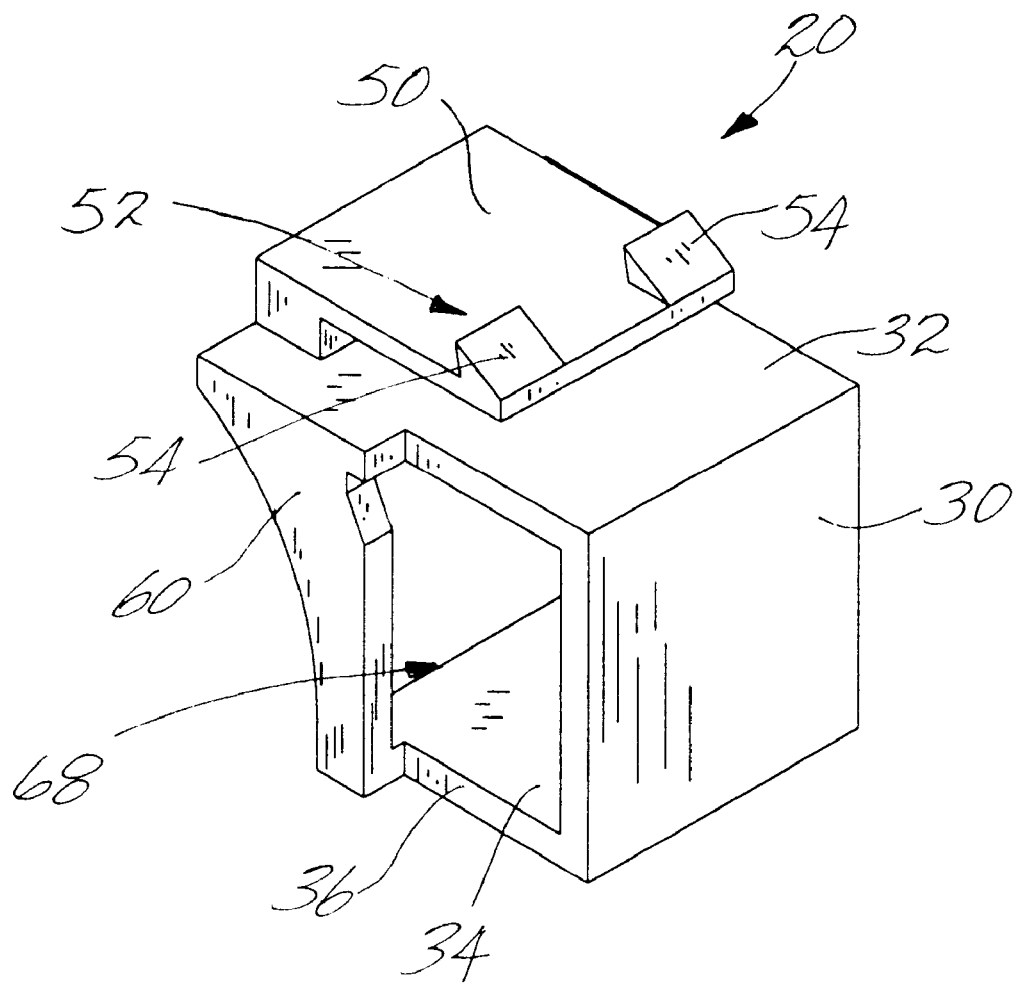
FIG. 2 is a top perspective view of the adapter housing with a flush front wall.
Figure 3:
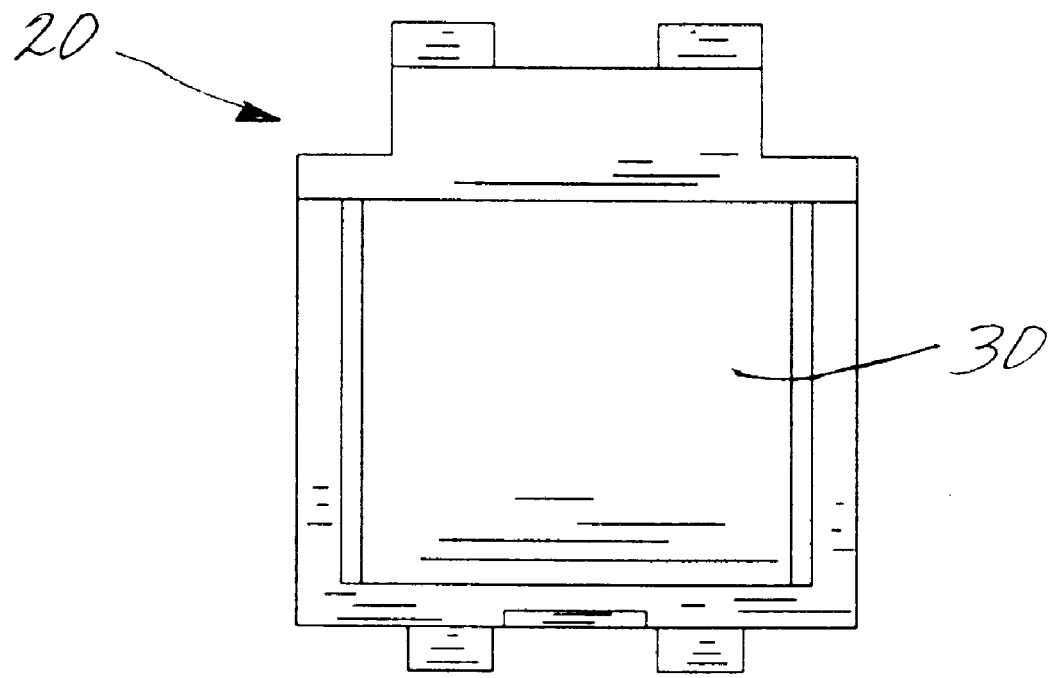
FIG. 3 is a front view of the adapter housing with the flush front wall.
Figure 4:
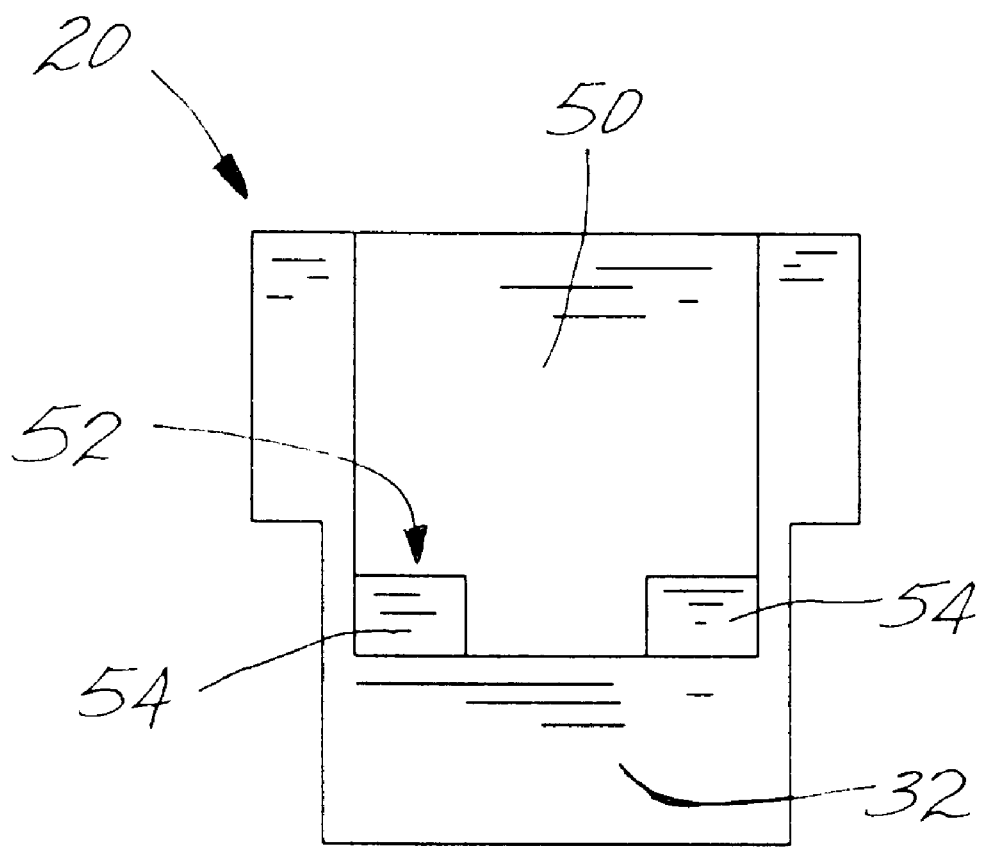
FIG. 4 is a top view of the adapter housing.
Figure 5:
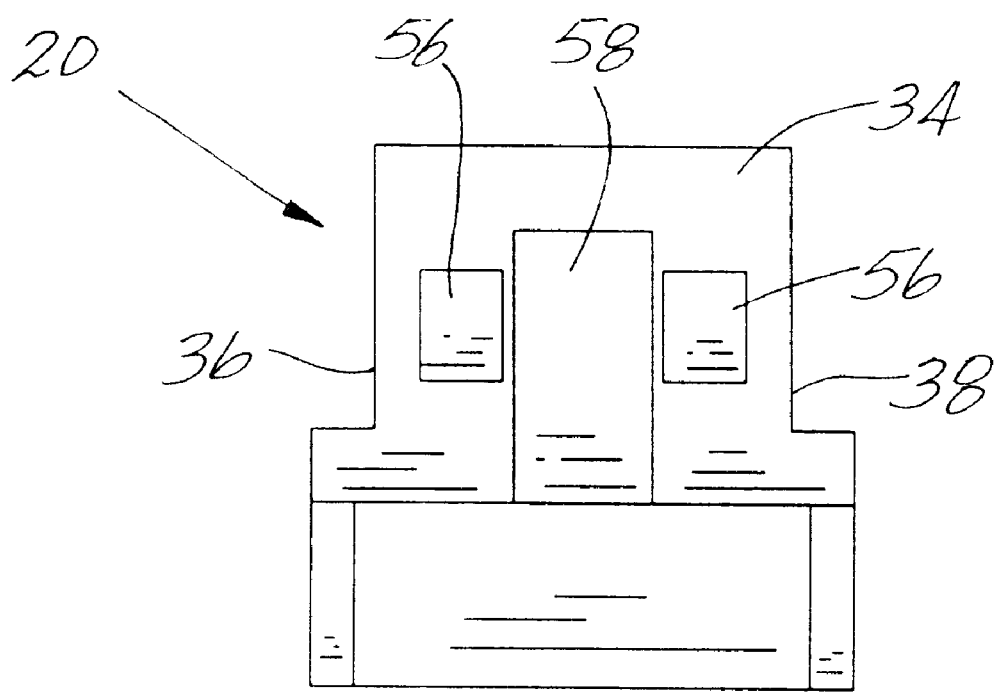
FIG. 5 is a bottom view of the adapter housing.

As shown in the exemplary drawings, and with particular reference to FIG. 1, the present invention is embodied in an adapter housing 20 which may be inserted into an outlet (not shown) of a base product (not shown) wherein the outlet is configured to receive a connector 24. It should be appreciated that the mounting of a housing into the outlet of a base product is well known in the art. Furthermore, the adapter housing 20 of the present invention may be inserted into the outlets of a variety of different base products including, but not limited to: patch panels, surface mount boxes, modular furniture plates, face plates, etc. Also, although a CATV connector is shown as connector 24, it should be appreciated that the adapter housing 20 may be configured to receive any number of different sorts of connectors.

Figure 6:
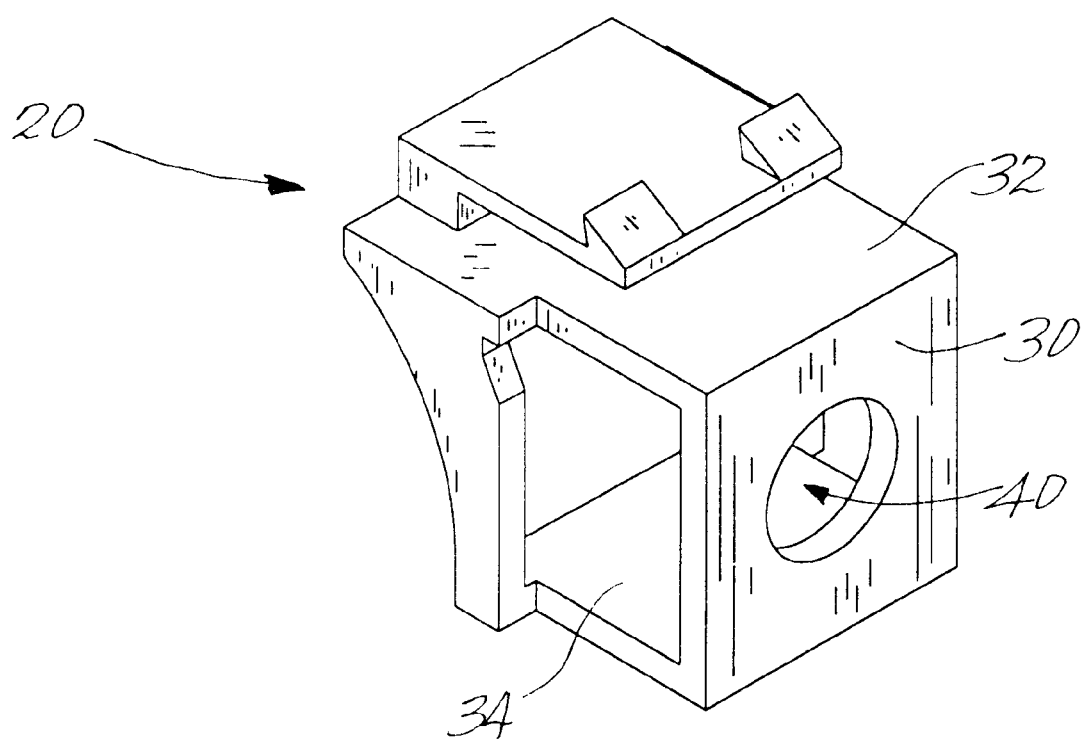
FIG. 6 is a top perspective view of the adapter housing with the front wall having an opening.

With reference also to FIGS. 2–5, the adapter housing 20 comprises a front wall 30, a top wall 32, and a bottom wall 34. The bottom wall 34 includes a first side 36 and a second side 38. The bottom wall 34 and the top wall 32 extend perpendicularly and rearwardly from the front wall 30. The bottom wall 34 and the top wall 32 are spaced apart by the front wall 30 and are parallel to each other. With reference also to FIG. 6, the front wall 30 may also include an opening 40. Preferably, the opening 40 is circular and centrally disposed relative to the front wall and may be a cable feed-through type opening. It should be appreciated that the opening 40 may be designed to assume whatever shape is necessary to conform to the shape of the connector that the opening is required to accept.

The adapter housing 20 may be installed into the outlet of a base product for both future expansion and for current cable feed-through access. There are two variations of the basic adapter housing 20. In the first variation, the adapter housing has a flush front wall 30 and is inserted into the outlet of a base product for future expansion of the outlet and is primarily used as a space filler (see FIGS. 2 and 3). The flush front wall prevents dust from collecting in the opening until the outlet is ready for use. In the second variation, the adapter housing preferably has an opening 40 in the center of the front wall 30 for mounting the connector 24 to the adapter housing and is used for existing outlets (see FIGS. 1 and 6). The connector 24 may be mounted through the opening 40 by placing the connector 24 through the opening 40 and by tightening an interior nut 70 and an exterior nut 72 to the front wall 30. This allows cable feed-through access through the housing. It should be appreciated that the mounting of connectors to housings is well known in the art.

Figure 7:
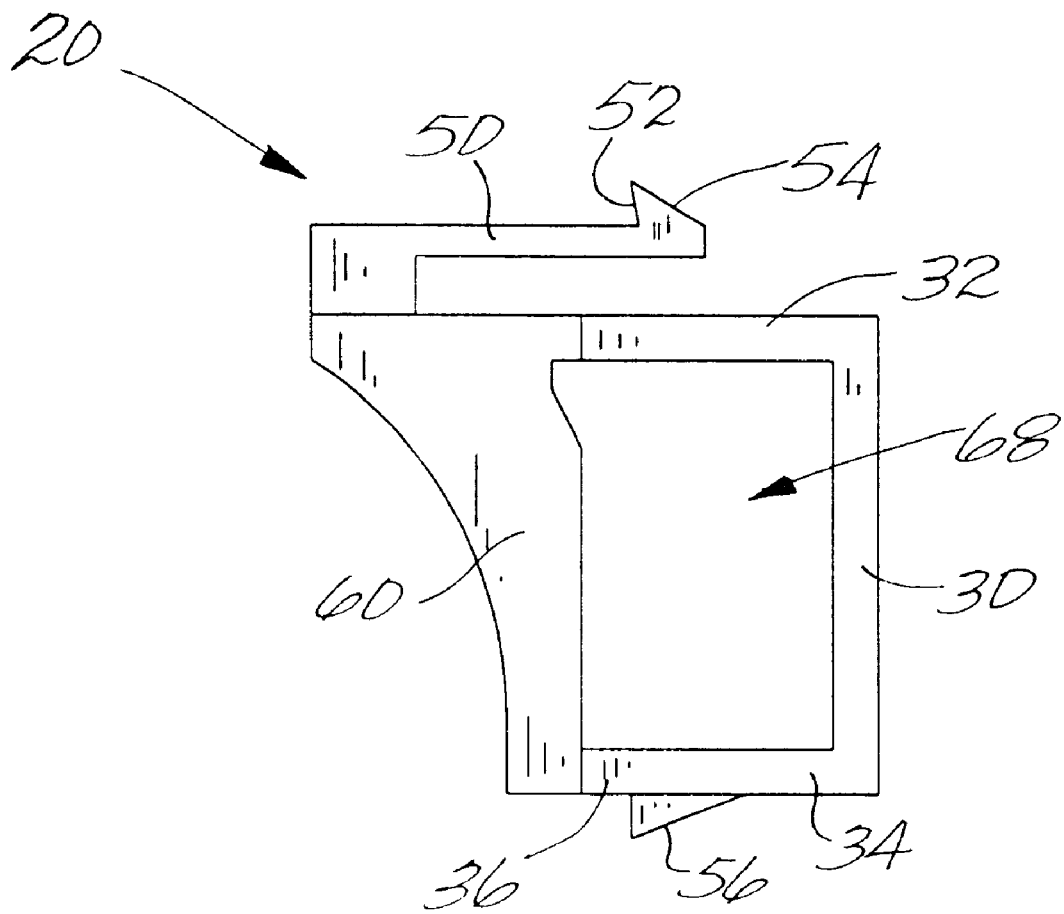
FIG. 7 is a left side view of the adapter housing, the other side being identical.
Figure 8:
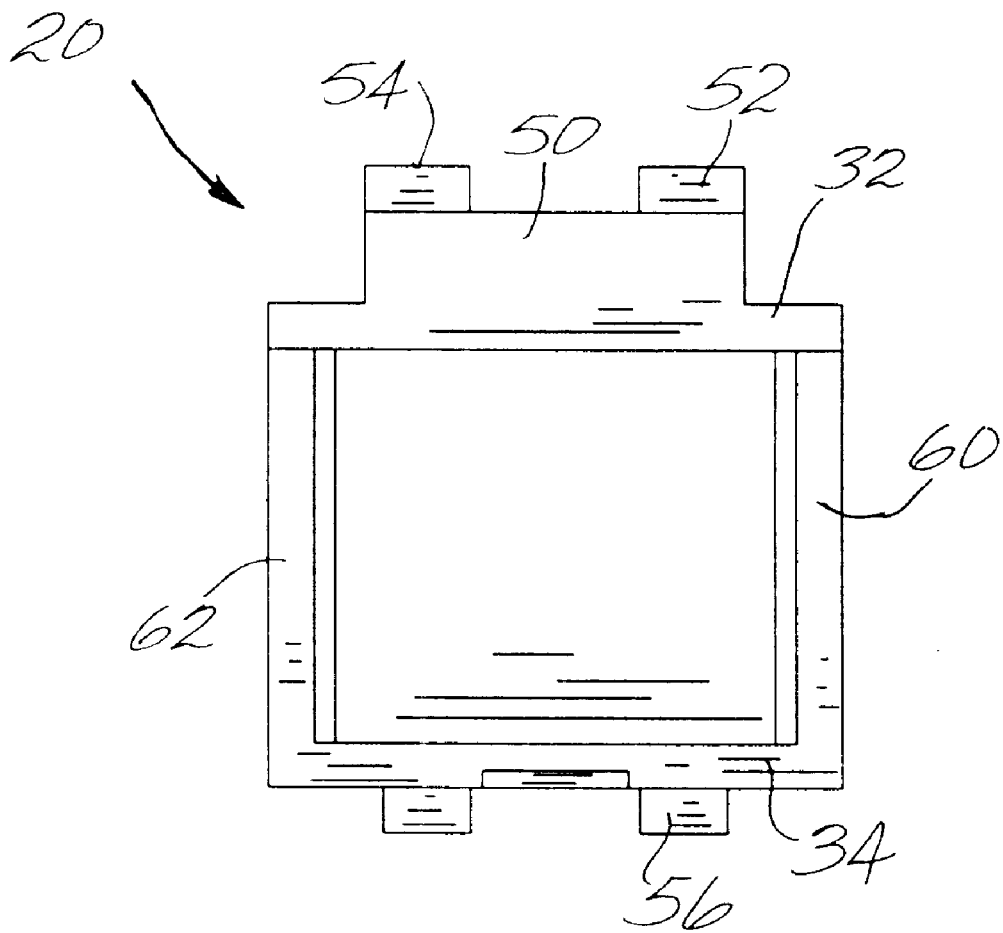
FIG. 8 is a back view of the adapter housing.

With reference also to FIGS. 7 and 8, the top wall 32 of the adapter housing 20 is preferably provided with a cantilever latch 50 having a vertical bearing surface 52 preferably composed of two parallel unconnected ramp pieces 54. The cantilever latch 50 may be used for mounting the adapter housing 20 to the outlet of a base product. When the housing is inserted into an outlet the vertical bearing surface 52 of the cantilever latch 50 latches to a mounting structure of the base product and the housing is thereby secured to the outlet. It should be appreciated that any number of differing latches well known in the art may be used to secure the housing to the outlet. Preferably, the bottom wall 34 may also be provided with two parallel unconnected ramp pieces 56. A rectangular recess 58 may also be located between the two parallel unconnected ramp pieces 56. The cantilever latch 50 of the top wall and the two ramp pieces 56 of the bottom wall facilitate installation and mounting of the housing to various types of outlets and base products.

A first leg 60 extends perpendicularly from the first side 36 of the bottom wall 34 to the top wall 32. Similarly, a second leg 62 extends perpendicularly from the second side 38 of the bottom wall 34 to the top wall 32. It should be appreciated that FIG. 7 is a left side view showing the first leg 60 and that the right side view (not shown) is identical.

The first and second legs 60 and 62 are spaced apart by the bottom wall 34 and are parallel to each other. Preferably, each leg 60 and 62 has an arched shape. The first and second legs 60 and 62 serve as support structures for the back of the adapter housing 20 such that they prevent the bottom wall 34 and the top wall 32 of the housing from bending. Advantageously, this aids in preventing the housing from popping out of the outlet of a base product. Therefore, the housing tends to remain securely retained within an outlet. This provides the related advantage of obviating the need to expend extra time, effort, and money to secure and re-secure the housing into its respective outlet.

The first and the second leg 60 and 62 may also be spaced from the front wall 30 such that each forms an aperture 68 allowing the interior nut 70 of the associated connector 24 to protrude into or through the aperture 68 and such that the nut 70 may be physically manipulated to be tightened or loosened (see FIG. 1). This allows the adapter housing 20 to be used in the same way as prior art housings which had no side walls to accommodate the nut of the associated connector. Advantageously, the adapter housing of the present invention having legs at the back of the housing along with spaced apertures, improves the design of the prior art housings by providing the additional strength needed while at the same time maintaining the same basic design such that it can still be used with all of the same base products, outlets, and connectors as the previous prior art housings.

The adapter housing 20 may be mounted to the outlet of a base product as follows. The front wall 30 of the housing 20 is inserted into the outlet from the rear of the base product such that the bottom wall 34 is first placed into the outlet until the two parallel unconnected ramp pieces 56 of the bottom wall engage a bottom mounting structure of the base product. The housing 20 is then rotated and snapped into place due to deflection of the cantilever latch 50. As the housing 20 is rotated into the outlet the vertical bearing surface 52 of the cantilever latch 50 latches to a top mounting structure of the base product and the housing 20 is thereby secured to the outlet and the base product. It should be appreciated that this illustrates only one possible method that may be used to mount the housing to the outlet of a base product. Many other methods are possible. Furthermore, it should be appreciated that the mounting of housings into the outlet of a base product is well known in the art.

Although the invention has been described in detail with reference to only a few preferred embodiments, those having ordinary skill in the art will appreciate that various modifications can be made without departing from the spirit of the invention. For example, it should be understood that the adapter housing may be inserted into a variety of different outlets and base products and may be configured to mount a variety of different connectors.

What is claimed is:

1. A housing for insertion into an outlet of a base product wherein the outlet is configured to receive an electrical connector, the housing comprising:

a front wall;

a top wall extending rearwardly from the front wall;

a bottom wall extending rearwardly from the front wall;

a first leg extending from the bottom wall to the top wall; and a second leg extending from the bottom wall to the top wall;

wherein the top wall and the bottom wall are parallel and spaced apart;

wherein the first and second legs are spaced from each other;

wherein the front wall, the top wall, the bottom wall and the first and second legs together define an interior empty space of the housing; and wherein the first and second legs are spaced from the front wall to define first and second openings, respectively, into the interior empty space from outside the housing.

2. The housing of claim 1, wherein the front wall has an opening.

3. The housing of claim 1, wherein the front wall has a centrally disposed opening.

4. The housing of claim 1, wherein the front wall has a circular opening.

5. The housing of claim 1, wherein the front wall has a centrally disposed circular opening.

6. The housing of claim 1, wherein one of the first leg or the second leg has an arched shape.

7. The housing of claim 1, wherein the first leg and the second leg have an arched shape.

8. The housing of claim 1, wherein the bottom wall has a first side and a second side, the first leg extending from the first side of the bottom wall to the top wall and the second leg extending from the second side of the bottom wall to the top wall such that the first and second legs are spaced apart by the bottom wall.

9. In combination:

a base product defining an electrical outlet; and a housing mounted in the electrical outlet, the housing having a front wall, a top wall extending rearwardly from the front wall, a bottom wall extending rearwardly from the front wall, a first leg extending from the bottom wall to the top wall, and a second leg extending from the bottom wall to the top wall;

wherein the top wall and the bottom wall of the housing are parallel and spaced apart;

wherein the first and second legs of the housing are spaced from each other;

wherein the front wall, the top wall, the bottom wall and the first and second legs of the housing together define an interior empty space of the housing; and wherein the first and second legs are spaced from the front wall to define first and second openings, respectively, into the interior empty space from outside the housing.

10. The housing of claim 9, wherein the front wall has an opening.

11. The housing of claim 9, wherein the front wall has a centrally disposed opening.

12. The housing of claim 9, wherein the front wall has a circular opening.

13. The housing of claim 9, wherein the front wall has a centrally disposed circular opening.

14. The housing of claim 9, wherein one of the first leg or the second leg has an arched shape.

15. The housing of claim 9, wherein the first leg and the second leg has an arched shape.

16. In combination:

a base product defining an electrical outlet; and a housing mounted in the electrical outlet, the housing having a front wall defining a hole, a top wall extending rearwardly from the front wall, a bottom wall extending rearwardly from the front wall, a first leg extending from the bottom wall to the top wall, a second leg extending from the bottom wall and to the top wall;

wherein the top wall and the bottom wall are parallel and spaced apart;

wherein the first and second legs are spaced from each other;

wherein the front wall, the top wall, the bottom wall and the first and second legs together define an interior empty space of the housing; and wherein the first and second legs are spaced from the front wall to define first and second openings, respectively, into the interior empty space from outside the housing; and an electrical connector mounted in the hole in the front wall of the housing and extending into the interior empty space.

* * * * *